(12) United States Patent
Satoh et al.

(10) Patent No.: US 6,623,684 B1
(45) Date of Patent: Sep. 23, 2003

(54) METHOD FOR MOLDING A GASKET FOR HARD DISC DRIVE UNIT

(75) Inventors: Norikazu Satoh, Ogasa-gun (JP); Masayuki Kishimoto, Kakegawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 09/399,168

(22) Filed: Sep. 20, 1999

(30) Foreign Application Priority Data

Sep. 18, 1998 (JP) ............................................. 10-264131

(51) Int. Cl.⁷ ......................... B29C 45/14; B29C 35/02; B29C 45/38
(52) U.S. Cl. ...................... 264/267; 264/259; 264/273; 264/274; 264/276
(58) Field of Search ................................ 264/267, 273, 264/274, 276, 255, 250, 268, 161, 275, 328.8; 425/120, 129.1, 130

(56) References Cited

U.S. PATENT DOCUMENTS

| | | | | | |
|---|---|---|---|---|---|
| 3,861,646 A | * | 1/1975 | Douglas | ...................... | 251/356 |
| 4,321,225 A | * | 3/1982 | Jelinek | ........................ | 264/138 |
| 4,410,479 A | * | 10/1983 | Cyriax | ........................ | 264/255 |
| 4,755,339 A | * | 7/1988 | Reilly et al. | ................. | 264/252 |
| 5,061,429 A | * | 10/1991 | Yoshihara et al. | .......... | 264/252 |
| 5,087,504 A | * | 2/1992 | Kanai et al. | ................. | 428/167 |
| 5,137,674 A | * | 8/1992 | Braconier | .................... | 264/161 |
| 5,643,521 A | * | 7/1997 | Nehm | ......................... | 264/255 |
| 5,658,509 A | * | 8/1997 | Sawyer et al. | ............... | 264/252 |

FOREIGN PATENT DOCUMENTS

JP            4-341986            11/1992

* cited by examiner

*Primary Examiner*—Angela Ortiz
(74) *Attorney, Agent, or Firm*—Jacobson Holman PLLC (57) ABSTRACT

A sealing gasket for a hard disc drive unit is made by molding an annular sealing member over an annular metal plate. The mold is, provided with an annular cavity and gatings to the cavity including sprue gates and film gates. The gatings are arranged radially outwardly of the cavity to ensure that any flashes or burrs resulting from the presence of the gatings are situated radially outwardly of the sealing member.

8 Claims, 7 Drawing Sheets

METHOD FOR MOLDING A GASKET FOR HARD DISC DRIVE UNIT

BACKGROUND OF THE INVENTION

1. Field of the Invention

The present invention relates to sealing gaskets suitable for use in hard disc drive units and methods of manufacturing the same.

2. Description of the Prior Art

As is well-known, a sealing gasket is used in a hard disc drive unit to hermetically seal a pair of metallic casings of the unit with each other.

Sealing gaskets made solely of an elastomeric material are difficult to handle and precisely position during assembling operations of the units because the elastomer material forming the gaskets is not self-sustaining and freely deformable.

Figure 1:
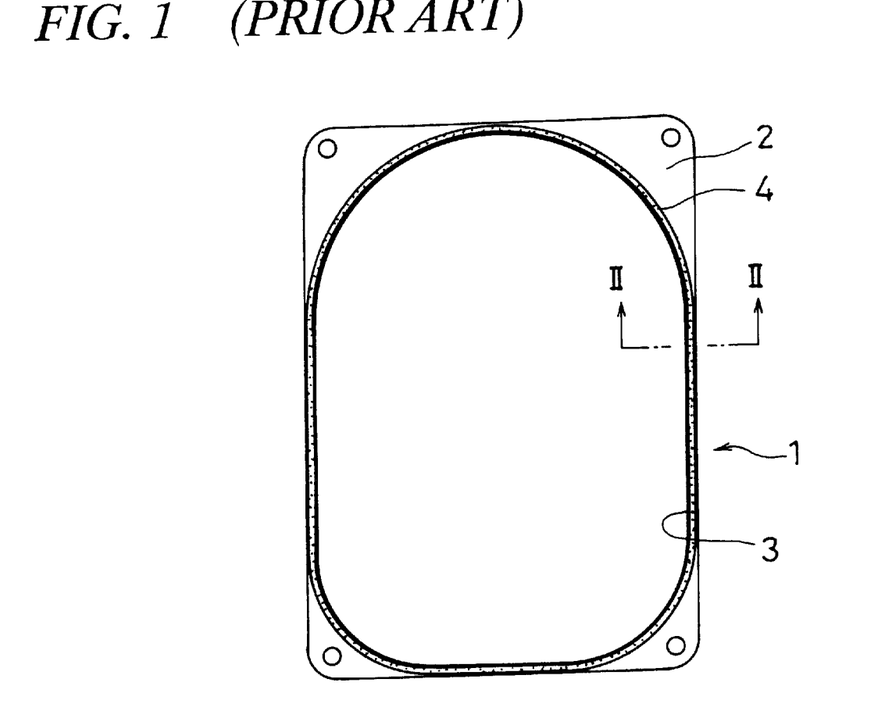
FIG. 1 is a top plan view of a conventional gasket.
Figure 2:
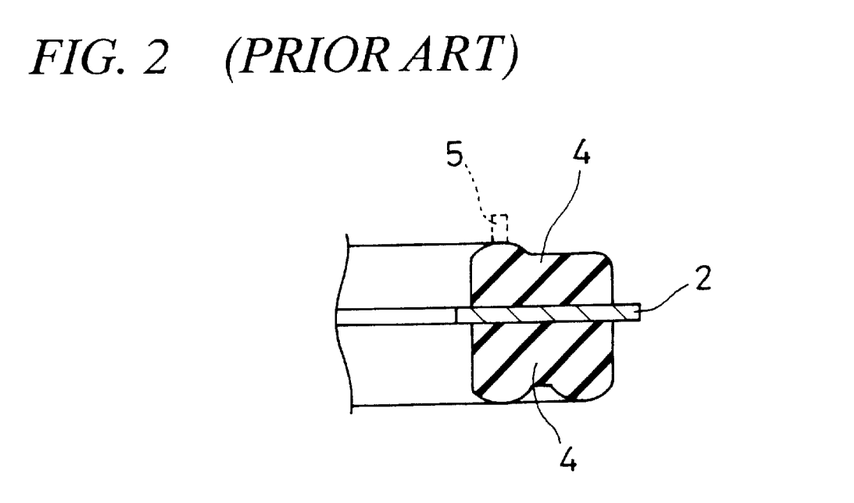
FIG. 2 is an enlarged cross-sectional view taken along the line II—II of FIG. 1.

To obviate these drawbacks, Japanese Patent Kokai Publication No. 4-341986 proposes a gasket having a resilient sealing member supported by a rigid support plate or substrate. As shown in FIGS. 1 and 2 of the accompanying drawings, the gasket 1 includes a support plate 2 made, for example, by stamping of a sheet metal. The support plate 2 is provided with a central opening or cutout 3 and is properly trimmed in conformity with the contour of the unit casings to be sealed. An annular sealing member 4 of an elastomeric material extending along a desired sealing line is bonded to or otherwise properly affixed to the support plate 2.

The gaskets 1 shown in FIGS. 1 and 2 may be made by using the conventional injection molding or transfer molding techniques by placing the support plate 2 in a cavity formed in a mold and injecting an uncured elastomeric molding composition into the cavity, followed by curing of the molding material.

The mold is provided with gatings to the cavity to permit injection of the uncured molding material into the cavity, as is well-known in the art. When molding is completed and the molded product is rejected out of the mold, a part of the cured molding material initially filling the gatings necessarily remains on the molded product. Such residual materials resulting and deriving from the presence of the gatings will be referred-to herein as "burrs", "flashes" or "gate residuals".

In one type of mold, the gatings to the cavity are arranged in the form of sprue gates which open into the cavity in a direction perpendicular to the parting plane of the mold. The presence of such sprue gates gives rise to the formation of burrs projecting from the sealing member 4 in the axial direction, as shown at 5 in FIG. 2. The formation of the axially projecting burrs 5 is undesirable since they impair the sealing capability of the gasket if brought into contact with the casings of the hard disc drive unit. Accordingly, the gaskets as molded must be subjected to deburring operations to remove the undesirable burrs 5 deriving from the gatings. This results in an increase in the production costs. In addition, the deburring operation may occasionally damage the surface of the sealing member.

To eliminate the formation of the axially projecting burrs, another type of mold has been used in which the gatings to the cavity are arranged in the form of film gates which are located inwardly of the cavity to open into the cavity in a direction parallel to the plane of the gasket.

An example of the gasket molded by this type of mold is shown in FIGS. 3–6. As shown, the gasket similarly includes an annular sealing member 6 of elastomer supported by a support plate 7 of sheet metal having an inner aperture or cutout 8, the sealing member 6 being likewise arranged to extend along the inner periphery of the support plate 7.

Figure 3:
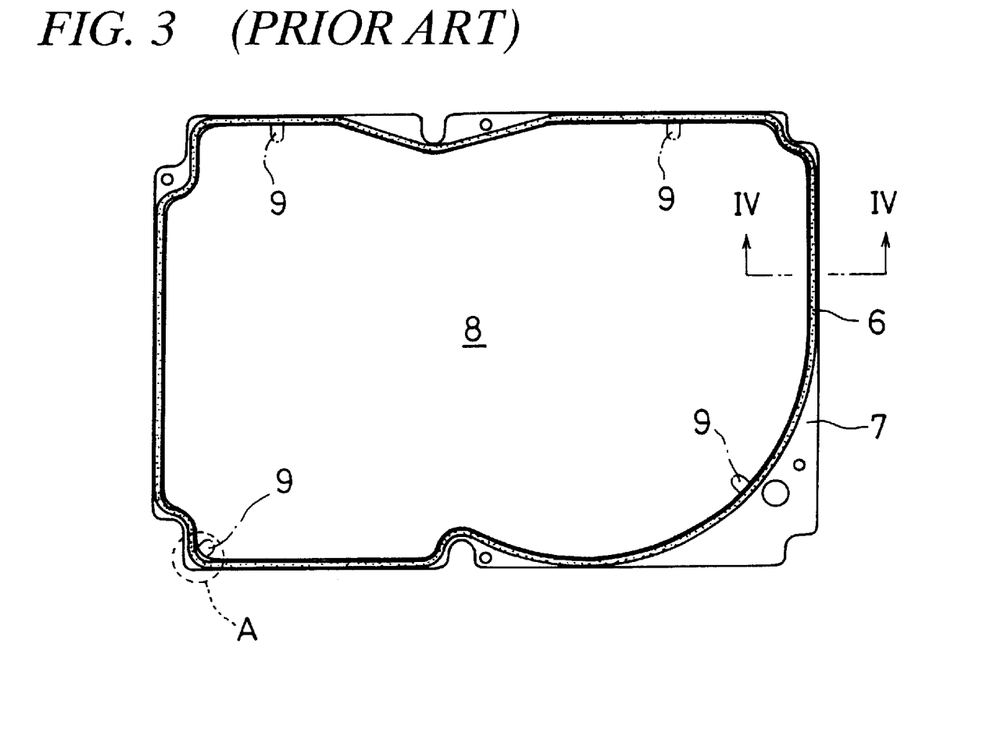
FIG. 3 is a top plan view of another type of the conventional gasket.
Figure 4:
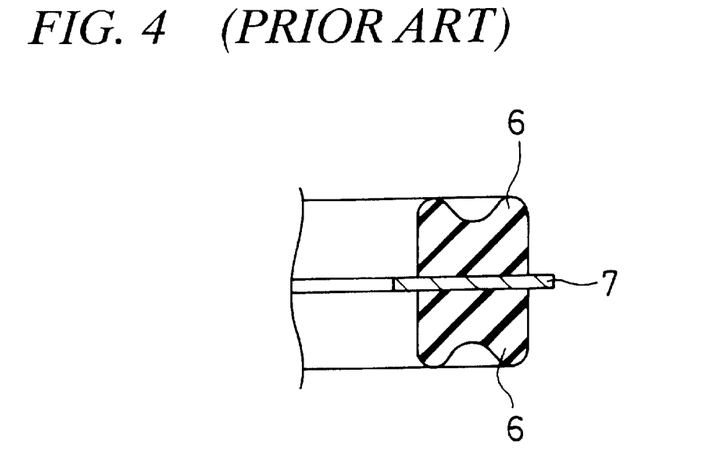
FIG. 4 is an enlarged cross-sectional view taken along the line IV—IV of FIG. 3.
Figure 5:
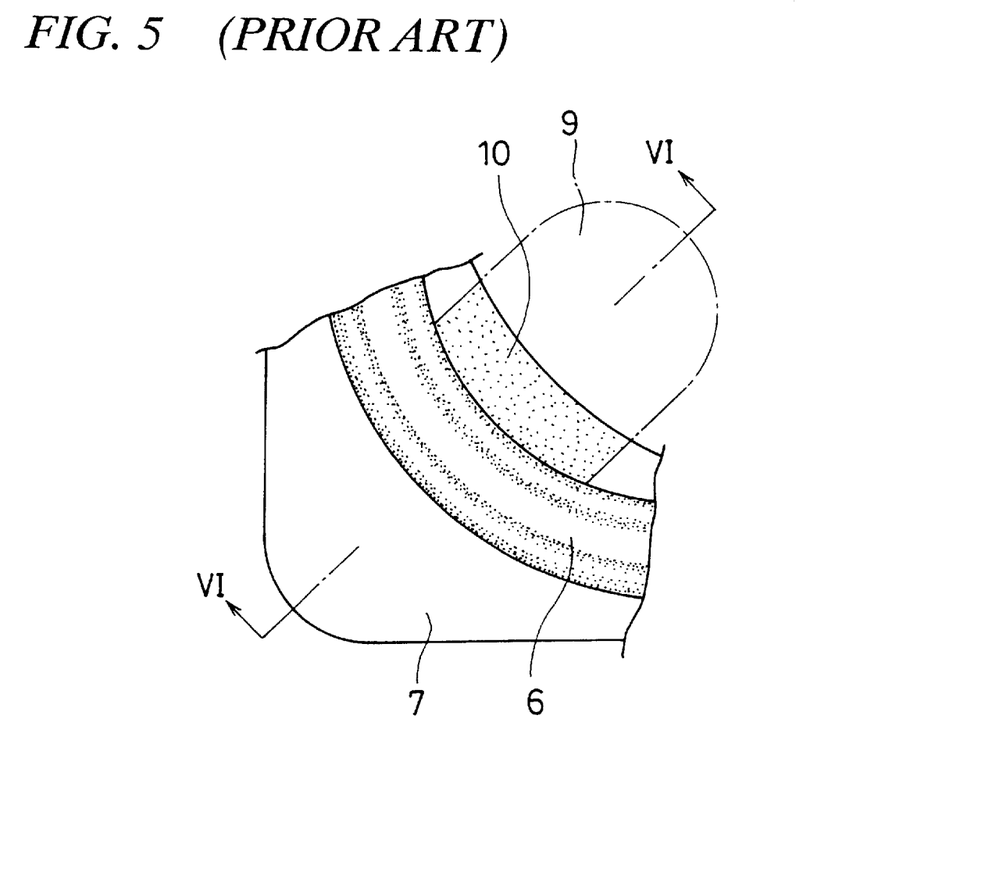
FIG. 5 is a top plan view showing in an enlarged scale the portion encircled by the circle A in FIG. 3.

However, the use of the mold provided with the film gates extending inwardly from the cavity would, in turn, result in the formation of flashes or film-shaped gate residuals 9 which extend inwardly beyond the inner periphery of the support plate 7 as shown by the ghost line in FIGS. 3 and 5, there being shown in FIG. 3 four such flashes 9 corresponding to the number of the film gates.

Formation of the flashes or residuals 9 still involves a certain problems. First, the flashes 9 must be removed very carefully by deflashing operations since the flashes projecting inwardly of the gasket into the inside of the unit casings may adversely affect the operation of the hard disc drive unit. The need for the deflashing operations substantially adds to the labor and time of manufacture.

Figure 6:
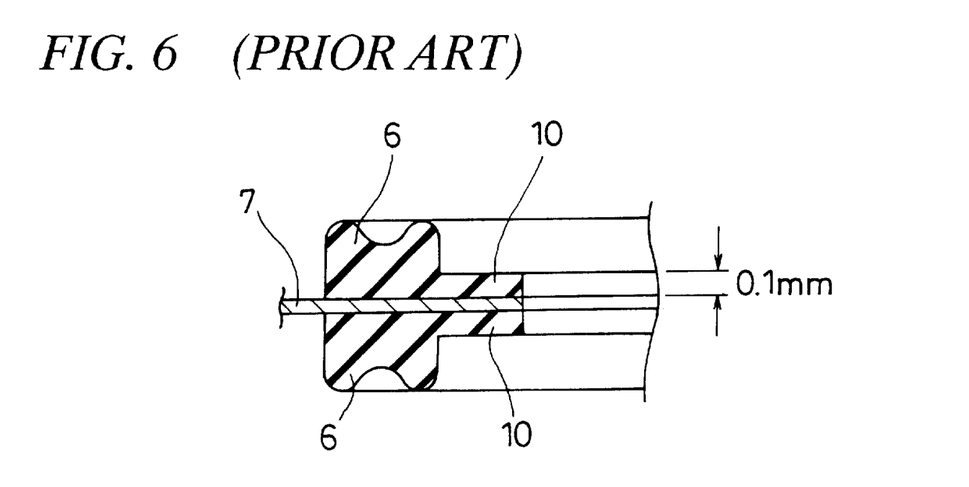
FIG. 6 is a cross-sectional view taken along the line VI–VI of FIG. 5.

Another disadvantage is related to the axial dimension or thickness of the film gates. More specifically, deflashing is carried out by moving a scraper blade along the inner edge of the support plate. By scraping with the scraper blade, the flashes or residuals 9 will be partly torn off from the molded product so that narrow residual segments 10 of the flashes 9 will be left on both sides of the finished gasket as shown in FIGS. 5 and 6. To permit or facilitate deflashing operations, the axial dimension of the film gates is preferably limited such that the axial thickness of the residual segment 10 is less than about 0.1 mm. As the residual segment 10 could not be bonded to the support plate 7 because it is preferable not to use an adhesive tending to issue any gaseous contaminants, there is a risk that the residual segments 10 having only a limited thickness are inadvertently torn off and separated from the sealing member 6.

As will be readily understood, in order to avoid crushing of the read-write heads and damage to the storage medium, sealing gaskets for use in hard disc drive units are subject to extremely strict quality requirements in that release or detachment of solid contaminants is absolutely prohibited.

Accordingly, it is an object of the present invention to provide a method of manufacturing a gasket which does not impair the operation and function of a hard disc drive unit and which provides an improved sealing capability.

Another object of the invention is to provide a method of manufacturing a gasket which is specifically designed to prevent separation or release of material forming the gasket.

A still another object of the invention is to provide a method of molding a gasket which method is capable of eliminating or minimizing the need for finishing operation such as deflashing and deburring.

SUMMARY OF THE INVENTION

This invention provides a method of molding an annular gasket by injecting or transferring an uncured elastomeric material into an annular cavity of a separable mold through a plurality of injection gates communicated with the cavity, followed by curing of the material.

The feature of the invention is that the injection gates formed in the mold are arranged radially outwardly of the cavity to ensure that, in the gasket as molded, any flashes or burrs resulting from the presence of the injection gates are formed radially outwardly of the gasket.

As in this manner any flashes or burrs that may be formed due to the presence of the injection gates are situated radially outwardly of the gasket, there is no risk that these flashes or burrs project inwardly of the gasket toward the inside of the casings of the hard disc drive unit in a manner to interfere with the internal component parts of the unit. Accordingly, deflashing or deburring operations after molding may be omitted altogether or more or less simplified.

Furthermore, should it happen that segments of these flashes or burrs are torn off or separated from the gasket for any reasons, such separation would occur outside of the unit casings so that the detached segments would never affect the operation of the internal components.

In a preferred embodiment of the invention, each of the injection gatings includes a film gate extending parallel to a parting plane of the mold to communicate with the cavity and a sprue gate extending perpendicular to the film gate to open into the film gate.

With this arrangement, when a cull is pulled and separated from the mold after curing of the molded material, the cull will be snapped or torn off from the gasket at some point in the sprue gate. This is advantageous in that deburring operation for removing the burrs deriving from the sprue gates can be omitted.

In a preferred embodiment, the gasket is made of an annular support plate made of a self-sustaining material such as metal and plastics, and of an annular sealing member of an elastomeric material affixed to and supported by the support plate. The film gates are provided at least on one side of the support plate. Preferably, the dimension of the film gates as measured perpendicular to the parting plane of the mold is equal to or larger than about 0.2 mm, preferably about 0.3 mm.

By using the film gates having an increased axial dimension, the thickness of the flashes resulting from the film gates is increased. This considerably increases the mechanical strength of the film gate flashes to permit the flashes to inseparably and securely adhere to the sealing member.

In another preferred embodiment of the method according to the invention, the mold cavity is so shaped that the sealing member is formed of a pair of symmetrical sealing beads disposed on both sides of the support plate. The support plate is provided with a plurality of through-openings.

Upon injection of uncured elastomeric material into the cavity followed by curing, the sealing beads on both sides of the support plate will be connected with each other by elastomeric material filled in the through-openings. This advantageously permits the sealing beads on both sides of the support plate to be securely affixed to the support plate without recourse to the use of an adhesive that would otherwise evolve gaseous emission.

In another aspect, this invention provides a method of molding a gasket having an annular elastomeric sealing member affixed to a support plate, the sealing member including a pair of symmetrical sealing beads disposed on both sides of the support plate, each of the sealing beads including inner and outer sealing lips radially spaced apart from one another. The injection gates are arranged to open into the cavity at a location situated radially outwardly of the inner sealing lip.

By arranging the injection gates at a location situated radially outwardly of the inner sealing lip, any flashes or burrs resulting from the injection gates will be formed radially outwardly of the inner sealing lip. As a result, the gasket is also free from the problem of detached or separated segments of flashes or burrs. In addition, there is no risk of the flashes or burrs interfering with the component parts within the unit casings because the flashes or burrs are formed outwardly of the inner sealing lip.

These features and advantages of the invention, as well as other features and advantages thereof, will become apparent from the following description.

DESCRIPTION OF THE PREFERRED EMBODIMENTS

Figure 7:
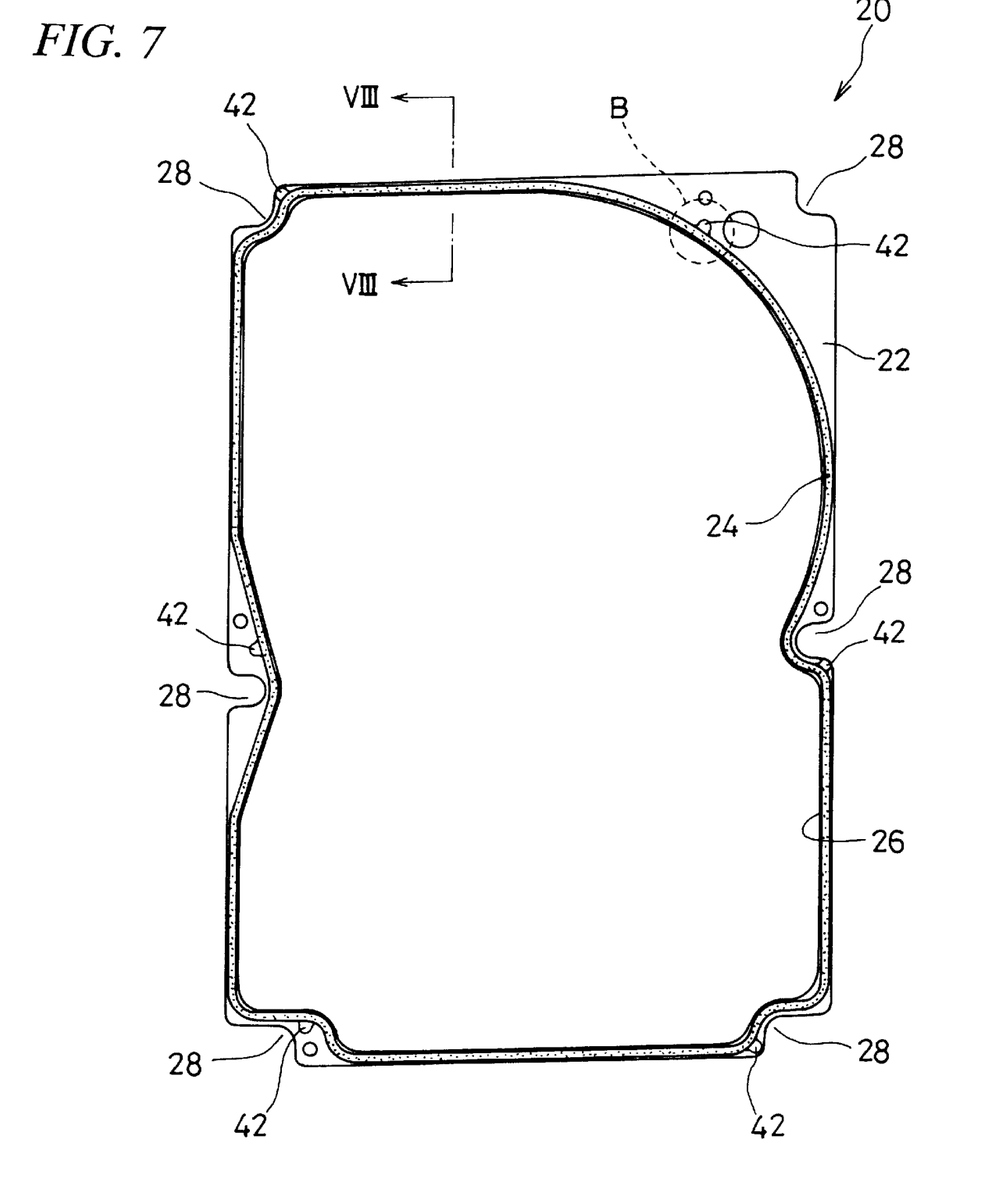
FIG. 7 is a top plan view of the gasket made by the method according to the invention.

In FIG. 7, there is shown a gasket manufactured by the method according to the invention. Referring to FIG. 7, the gasket 20 for a hard disc drive unit includes a support or carrier plate 22 and an annular sealing member 24 affixed to the support plate 22 in a manner described later.

The support plate 22 may be made by punching and stamping of a sheet metal made of stainless steel. The substrate 22 has a generally rectangular outer contour and is provided with a central opening or cutout 26 which is trimmed in conformity with the design of the casings of a hard disc drive unit, not shown, the gasket 20 being intended to be sandwiched between the casings of the unit to establish a hermetic seal. By the provision of the central opening 26, the support plate 22 is shaped in a somewhat annular or endless configuration. The support plate 22 is provided at its outer periphery with a plurality of recesses 28 which are intended to pass screws, not shown, used to fasten the casings of the hard disc drive unit together.

The sealing member 24 is made by molding of an elastomeric material, preferably a fluororubber, and is arranged to extend along the inner periphery of the support plate 22 in an annular endless manner.

Figure 8:
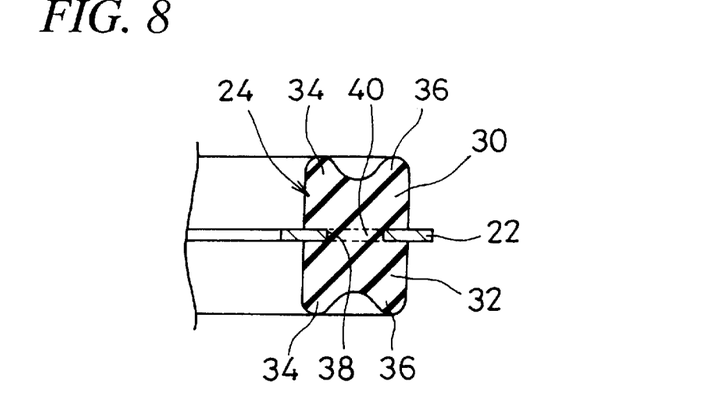
FIG. 8 is a cross-sectional view taken along the line VIII—VIII of FIG. 7.

As shown in FIG. 8, the sealing member 24 is formed of a pair of symmetrical sealing beads 30 and 32 disposed on both sides of the support plate 22, each sealing bead including an inner sealing lip 34 and an outer sealing lip 36 spaced apart from one another in the radial direction.

Figure 9:
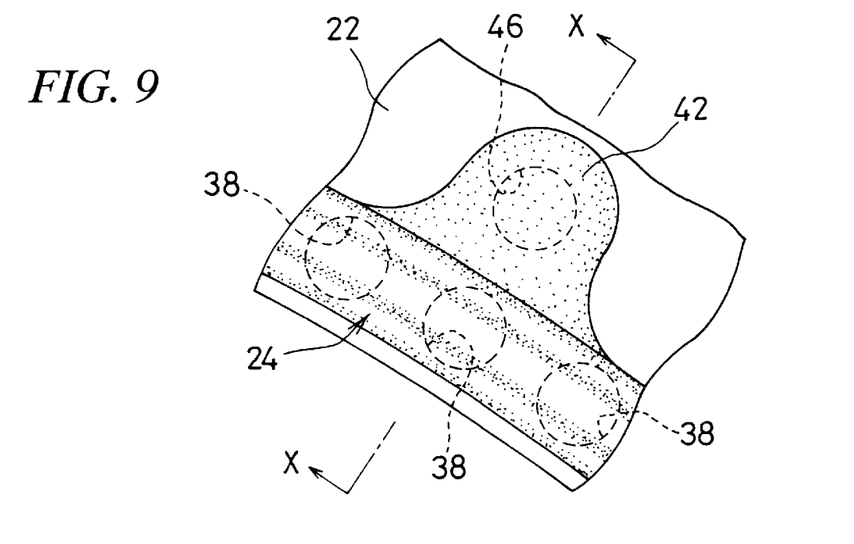
FIG. 9 is a top plan view showing in an enlarged scale the portion encircled by the circle B in FIG. 7.
Figure 10:
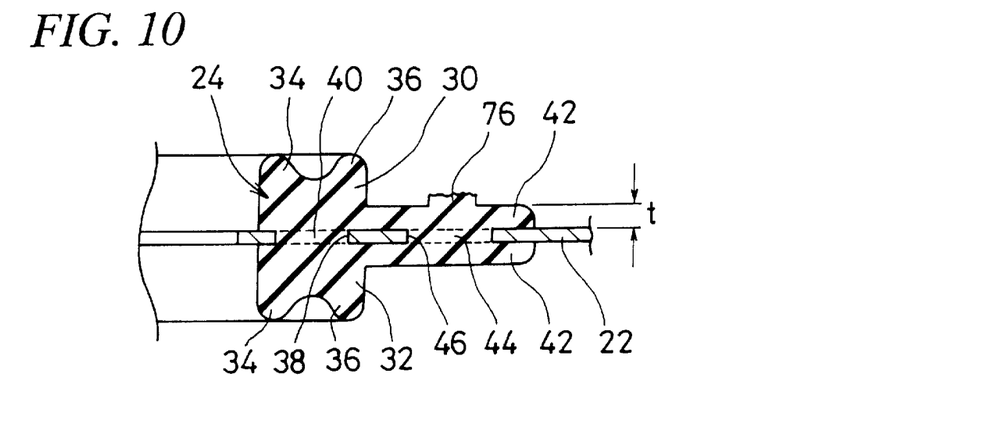
FIG. 10 is a cross-sectional view taken along the line X—X of FIG. 9.

As shown in FIGS. 8–10, the support plate 22 is provided with a plurality of through-openings 38 arranged along the sealing member 24 and spaced apart from each other. As a result, the upper and lower sealing beads 30 and 32 molded on both sides of the support plate 22 will connected with each other by the elastomer masses 40 being present in the through-openings 38 when the molding of the gasket 20 is completed. The through-openings 38 at the linearly extending portion of the sealing member 24 are spaced apart from each other at a predetermined equal distance but the spacing thereof at the curved portions of the sealing member 24 is reduced in order to suppress any deformation by shrinkage of the molded material. Similarly, the spacing of the through-openings 38 formed in the vicinity of sprue gates, described later, is further reduced in order to increase the resistance of the sealing member to withstand the pulling force which is subsequently exerted onto the sealing member during cull removal operation.

It should be noted that the sealing beads 30 and 32 on both sides of the support plate are affixed and retained to the support plate 22 primarily by the elastomer masses 40 in the through-openings 38 that connect the sealing beads with each other and that no adhesive is used to bond the upper and lower sealing beads 30 and 32 to the support plate 22. Accordingly, the gasket 20 as manufactured is free from issuance of a gaseous contaminant which would adversely affect the component parts of the hard disc drive unit.

Referring again to FIG. 7, there are left on the gasket 20 as molded a plurality of residual flashes 42 resulting from the presence of injection or transfer gatings in the mold, described later with reference to FIGS. 11 and 12, there being six such flashes 42 in the illustrated embodiment. The residual flashes 42 are tongue-shaped and project radially outwardly from the sealing member 24.

The residual flashes 42 deriving from the gatings are formed on both sides of the support plate 22 and are integral with the upper and lower sealing beads 30 and 32 as shown in FIG. 10. The residual flashes 42 at the upper and lower sides of the support plate 22 are connected with each other by a mass 44 of elastomer material filled in a through-hole 46 punched across the support plate 22 as shown in FIGS. 9 and 10. Similar to the elastomer masses 40 in the through-apertures 38, the masses 44 of the elastomer material serve to retain the sealing member 24 onto the support plate 22. The gatings in the mold is so sized that the axial thickness t of each flash 42 is preferably as large as about 0.3 mm.

Figure 11:
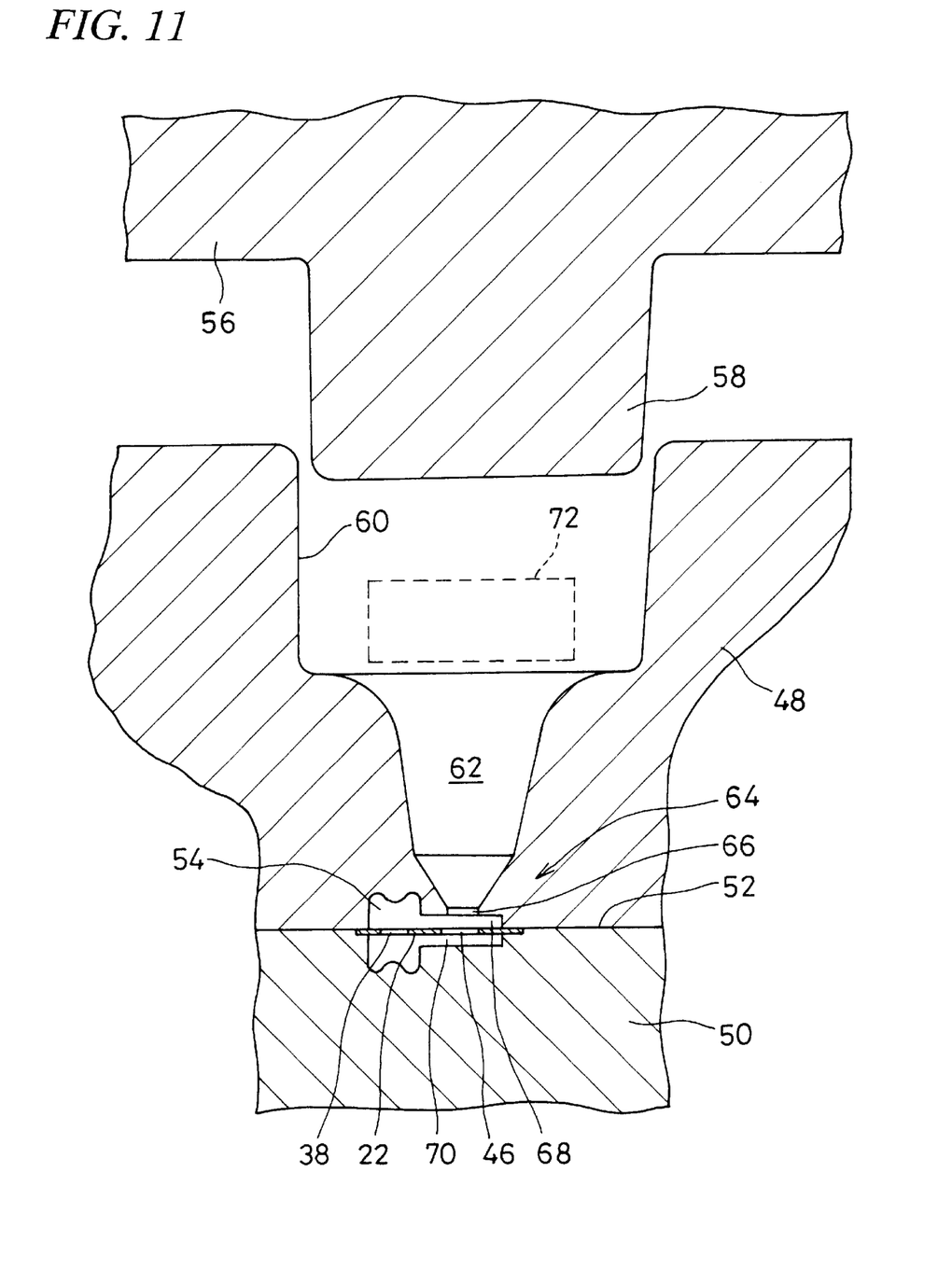
FIG. 11 is a schematic cross-sectional view showing a part of the transfer molding machine used for carrying out the method according to the invention, the cross-section being taken along a section plane corresponding to the line X—X of FIG. 9; and, FIG. 12 is a cross-sectional view similar to FIG. 11 but showing the molds as separated.
Figure 12:
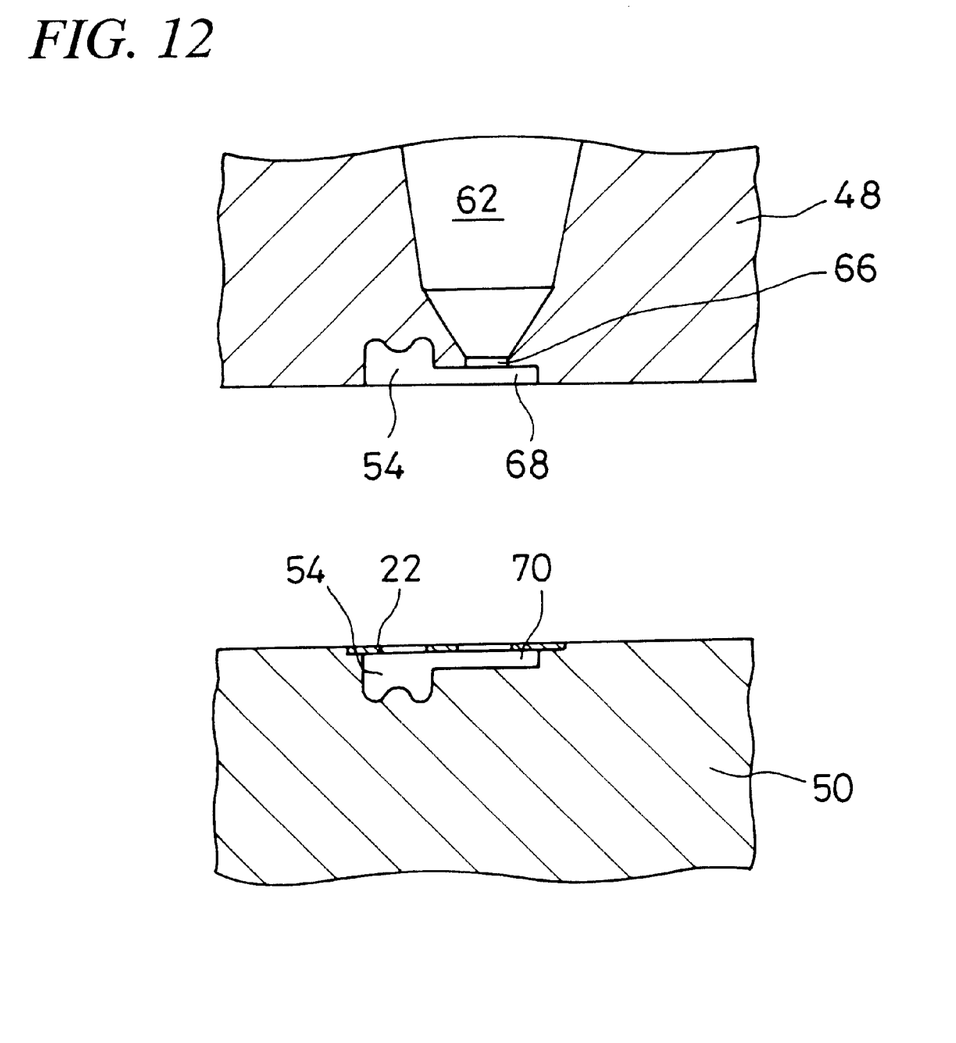

The gasket 20 may be molded by using, for example, a transfer molding machine schematically shown in part in FIG. 11. The molding machine is provided with a heated upper mold 48 and a heated lower mold 50 which are separable from one another along a parting plane 52. The upper and lower molds 48 and 50 are formed with an annular cavity 54 which is complementary in shape to the gasket 20 to be manufactured.

The molding machine further includes a movable upper member 56 having a downwardly projecting annular piston or plunger 58 which is designed to cooperate with a transfer pot or chamber 60 formed in the upper mold 48, the transfer pot or chamber 60 being configured in the form of an annular groove.

The annular transfer chamber 60 is communicated with the annular cavity 54 through a plurality of tapered injection spots 62 extending perpendicular to the parting plane 52 of the molds and a plurality of injection gatings 64 arranged downstream of the injection spots 62. The injection spots 62 and the associated injection gatings 64 are equally spaced apart and dispersed along the length of the cavity 54 to ensure that the uncured molding material from the transfer chamber 60 is uniformly distributed over the entire length of the cavity 54, the number and the circumferential position of the injection spots 62 and the injection gatings 64 corresponding to those of the residual flashes 42 shown in FIG. 7.

Each injection gating 64 is comprised of a small-diameter sprue gate 66 formed at the lower end of the injection spot 62 and a first or upper film gate 68 formed in the upper mold 48. The lower mold 50 is provided with a second or lower film gate 70 formed opposite to the first film gate 68. The first and second film gates 68 and 70 extend parallel to the parting plane 52 and open laterally into the cavity 54. The sprue gates 66 as well as the first and second film gates 68 and 70 are all situated radially outwardly of the cavity 54 in such a manner that the residual flashes 42 resulting from the film gates 68 and 70 are situated radially outwardly of the sealing member 24 as shown in FIG. 7.

Molding of the gasket 20 by the transfer molding machine may be carried out in the following manner. The preheated upper and lower molds 48 and 50 are separated to open the cavity 54 and a support plate 22 is placed on the lower mold 50 as shown in FIG. 12. The molds 48 and 50 are then clamped together to close the cavity 54.

A mass of preheated uncured elastomeric molding material in the form of a preformed annular tablet 72 is then placed in the preheated transfer chamber 60 as shown in FIG. 11. Upon downward stroke of the movable member 56, the annular piston 58 causes the uncured material 72 in the transfer chamber 60 to be squeezed and injected into the upper half of the molding cavity 54 through the injection spots 62, the sprue gates 66 and the upper or first film gates 68.

A part of the uncured material injected into the upper half of the cavity 54 will be forced to flow through the through-openings 38 in the support plate 22 into the lower half of the cavity 54. Similarly, a part of the uncured material squeezed into the first or upper film gates 68 will be forced to flow through the through-hole 46 in the support plate 22 into the second or lower film gates 70 and will be injected therefrom into the lower half of the molding cavity 54.

As the film gates 68 and 70 have an increased axial dimension and, hence, present an increased cross-sectional flow area so that the flow resistance thereof is reduced, the uncured molding material will be quickly and smoothly injected into the cavity 54. This is advantageous in avoiding formation of an undesirable weld line in the molded product.

The elastomeric material in the molds is continued to be heated until it is cured to a desired degree. Upon curing, the movable member 56 is retracted upwards and a cull 74 remaining in the transfer chamber 60 is removed therefrom by strongly pulling the cull 74 upwards away from the upper mold.

Since the sprue gates 66 are of a reduced diameter so that the tensile strength of the cured elastomer material at the sprue gates 66 is weakened, strong pull on the cull 74 would cause the cull to be snapped off or torn off from the cured material remaining in the film gates 68 and 70 at some point in the sprue gates 66. As a result, short burrs or sprue gate residuals 76 resulting from the sprue gates 66 may occasionally be left on the molded product as shown in FIG. 10. However, the presence of the burrs 76 does not degrade the sealing capability of the gasket since they are situated radially outwardly of the sealing member 24. Accordingly, the burrs 76 need not be specifically removed by deburring operations but may be left as formed.

After removal of the cull 74, the molds 48 and 50 are separated and the gasket as molded is taken out of the cavity.

The gasket as molded may be then subjected to ultrasonic cleaning operations to remove any flashes and burrs which adhere to the molded product only weakly as well as to dislodge releasing agent and dusts adhering to the product. Any flashes and burrs which are resulted from the gatings and which strongly and firmly adhere to the molded product need not be removed so that it is not necessary to subject the product as molded to manual deflashing or deburring operations.

The finished gaskets 20 may be installed in hard disc drive units in a manner similar to the gaskets made by the conventional methods. It will be noted that, since the residual flashes 42 resulting from the film gates 68 and 70 as well as the burrs 76 resulting from the sprue gates 66 are all located radially outwardly of the sealing member 24, there is no risk of these flashes to project inwardly of the casings of the hard disc drive units in a manner to interfere the operation of the internal components. Therefore, deflashing and deburring operations of the molded products may be omitted or otherwise simplified.

As the flashes 42 and burrs 76 firmly adhere to the sealing member 24, there is no risk that these flashes and burrs are inadvertently separated or detached from the sealing member 24. In the event that these flashes or burrs are separated or detached from the gasket for any reasons, separated flashes or burrs would not affect the operation of the internal components since the flashes 42 and burrs 76 are located radially outwardly of the sealing member 24 and because separation of these flashes and burrs would occur outside of the casings.

In the foregoing embodiment, the film gates 68 and 70 in the molds are arranged at the lateral side of the cavity 54 to extend along the parting plane 52. However, in a modified version of the method according to the invention, the injection gatings to the cavity 54 may be arranged to open into the cavity at a location situated at least radially outwardly of the inner sealing lip 34 of one or both of the sealing beads 30 and 32, for example at the valley between the inner lip 34 and the outer lip 36. The advantages gained by the modified arrangement are similar to those of the first embodiment.

While the present invention has been described herein with reference to the specific embodiments thereof, it is contemplated that the present invention is not limited thereby and various changes and modifications may be made therein for those skilled in the art without departing from the scope of the invention. For example, the present invention is not limited to the manufacture of the sealing gaskets for use in hard disc drive units but may be equally applied to the manufacture of gasket intended for other usage.

We claim:

1. A method of molding an annular gasket, said method comprising:

injecting an uncured elastomeric material into an annular cavity of a separable mold through a plurality of injection gates communicated with said cavity, followed by curing of said material, and arranging said injection gates radially outwardly of said cavity to ensure that, in the gasket as molded including a self-sustaining support plate made of stainless steel, any flashes or burrs resulting from the presence of said injection gates are situated radially outwardly of the gasket.

2. A method of molding an annular gasket, said method comprising:

injecting an uncured elastomeric material into an annular cavity of a separable mold through a plurality of injection gates communicated with said cavity, followed by curing of said material, and arranging said injection gates radially outwardly of said cavity to ensure that, in the gasket as molded, any flashes or burrs resulting from the presence of said injection gates are situated radially outwardly of the gasket, each of said injection gates including a film gate extending parallel to a parting plane of said mold to communicate with said cavity and a sprue gate extending perpendicular to said film gate to communicate with said film gate.

3. A method according to claim 2, wherein said gasket includes a self-sustaining support plate having a central opening and an annular elastomeric sealing member affixed to and supported by said support plate, wherein said film gates are provided at least on one side of said support plate, and wherein the dimension of said film gates as measured perpendicular to said parting plane is equal to or larger than about 0.2 mm.

4. A method according to claim 3, wherein said cavity is so shaped that said sealing member is formed of a pair of symmetrical sealing beads disposed on both sides of said support plate, and wherein said support plate is provided with a plurality of through-openings to ensure that, upon injection of uncured elastomeric material into said cavity followed by curing, said sealing beads on both sides of said support plate are connected with each other by elastomeric material filled in said through-openings.

5. A method according to claim 4, wherein said pair of sealing beads are affixed to said support plate primarily by said elastomeric material filled in said through-openings.

6. A method according to claim 3, wherein said film gates are provided on both sides of said support plate.

7. A method according to claim 6, wherein in the region of said film gates said support plate is provided with a plurality of through-holes to ensure that, upon injection of uncured elastomeric material into said cavity followed by curing, residual flashes remaining on respective sides of said support plate are connected with each other by elastomeric material being present in said through-holes.

8. A method of molding a gasket, said method comprising injecting an uncured elastomeric material into an annular cavity of a separable mold through a plurality of injection gates communicated with said cavity, followed by curing of said material, said gasket including an annular elastomeric sealing member affixed to and supported by a self-sustaining support plate having a central opening, said sealing member including a pair of symmetrical sealing beads disposed on both sides of said support plate, each of said sealing beads including inner and outer sealing lips radially spaced apart from one another, and arranging said injection gates to open into said cavity at a location situated radially outwardly of said inner sealing lip.

* * * * *